United States Patent [19]

Pointner

[11] Patent Number: 4,462,442

[45] Date of Patent: Jul. 31, 1984

[54] VENEER LATHE HOLD-DOWN ROLLS

[76] Inventor: John C. Pointner, 601 Lakeside Ave., Coeur d'Alene, Id. 83814

[21] Appl. No.: 413,274

[22] Filed: Aug. 30, 1982

[51] Int. Cl.³ .............................................. B27L 5/02
[52] U.S. Cl. .................................... 144/213; 144/365
[58] Field of Search .............. 144/209 R, 209 A, 213, 144/365; 82/38 R, 39, 45

[56] References Cited

U.S. PATENT DOCUMENTS 3,040,791  6/1962  Fauchon .......................... 144/213 A
3,372,721  3/1968  James et al. ......................... 144/213

FOREIGN PATENT DOCUMENTS 712685  7/1954  United Kingdom ........... 144/213 A
586997  1/1978  U.S.S.R. ......................... 144/213 A Primary Examiner—W. D. Bray
Attorney, Agent, or Firm—Wells, St. John & Roberts

[57] ABSTRACT

Disclosed is a machine for supporting a log in a veneer lathe so that the log does not deflect. The machine has two rolls which engage the log opposite the lathe knife and nose bar. The rolls are mounted on a roll carriage having a kinematic linkage which maintains both rolls in positions tangential to the log throughout a range of log diameters. The roll carriage is powered by a feed screw mechanism which mechanically synchronizes the rolls' positions with respect to the knife and knife carriage. A control system is provided to automatically lower and raise the roll carriage or to operate it manually when desired.

6 Claims, 9 Drawing Figures

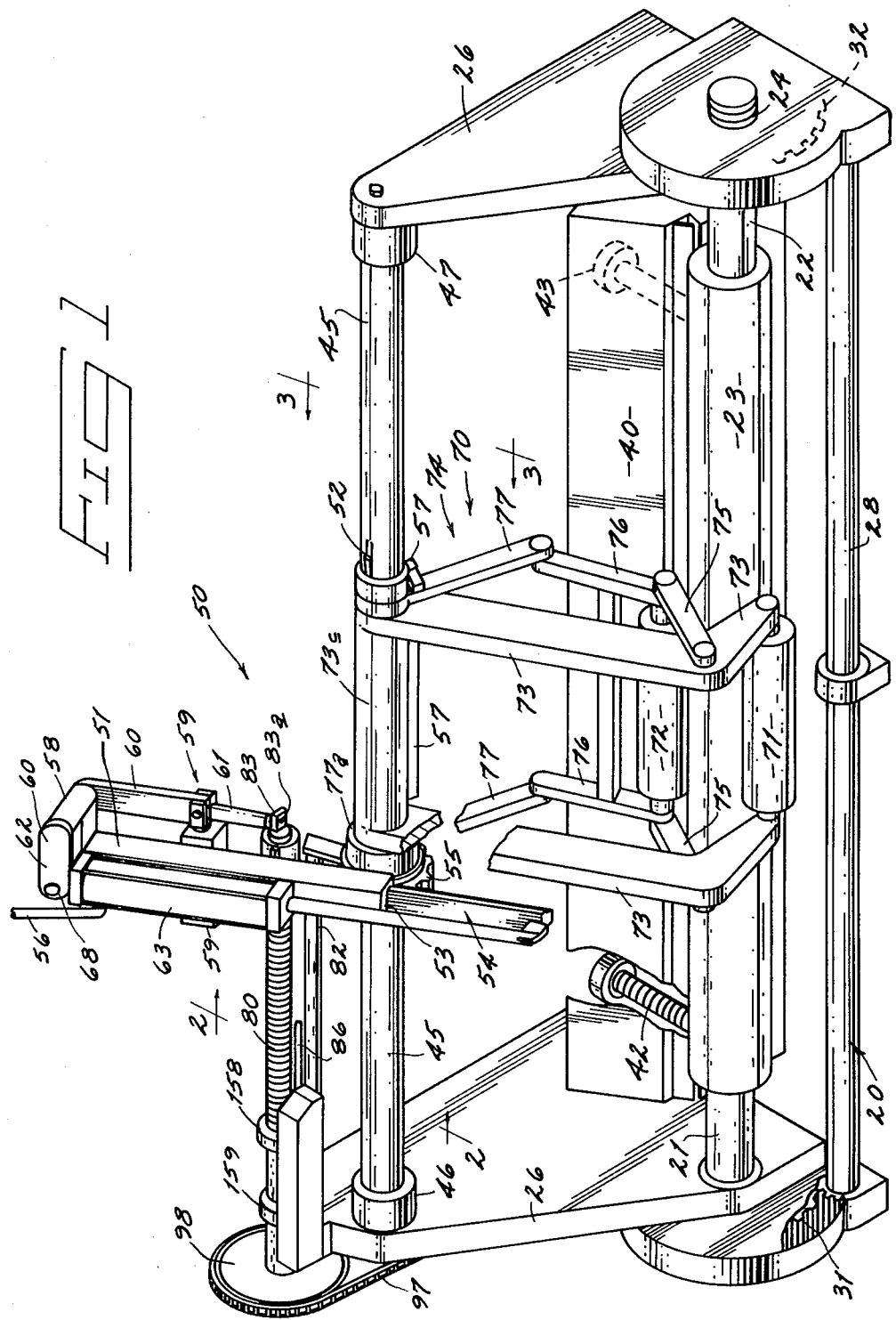

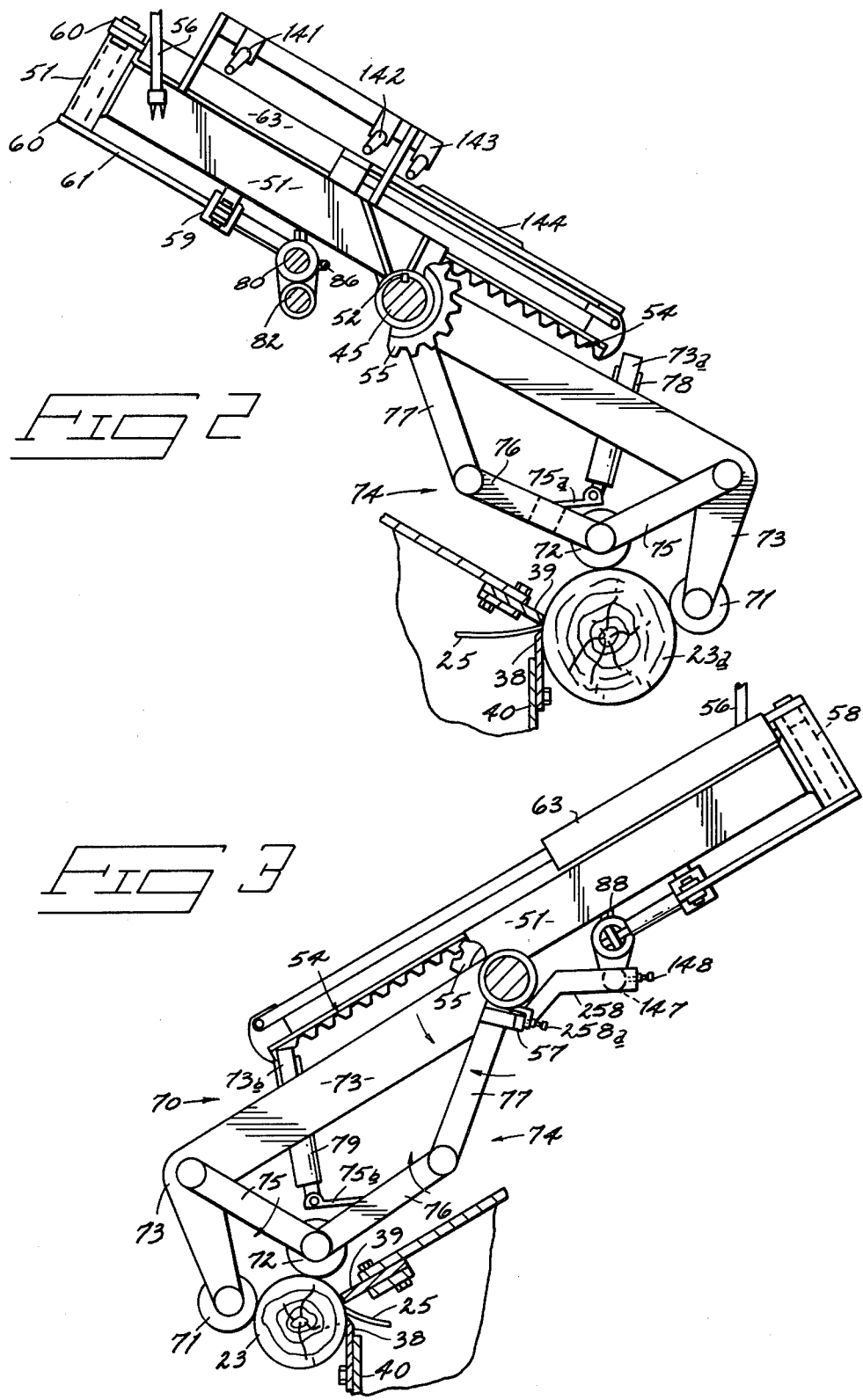

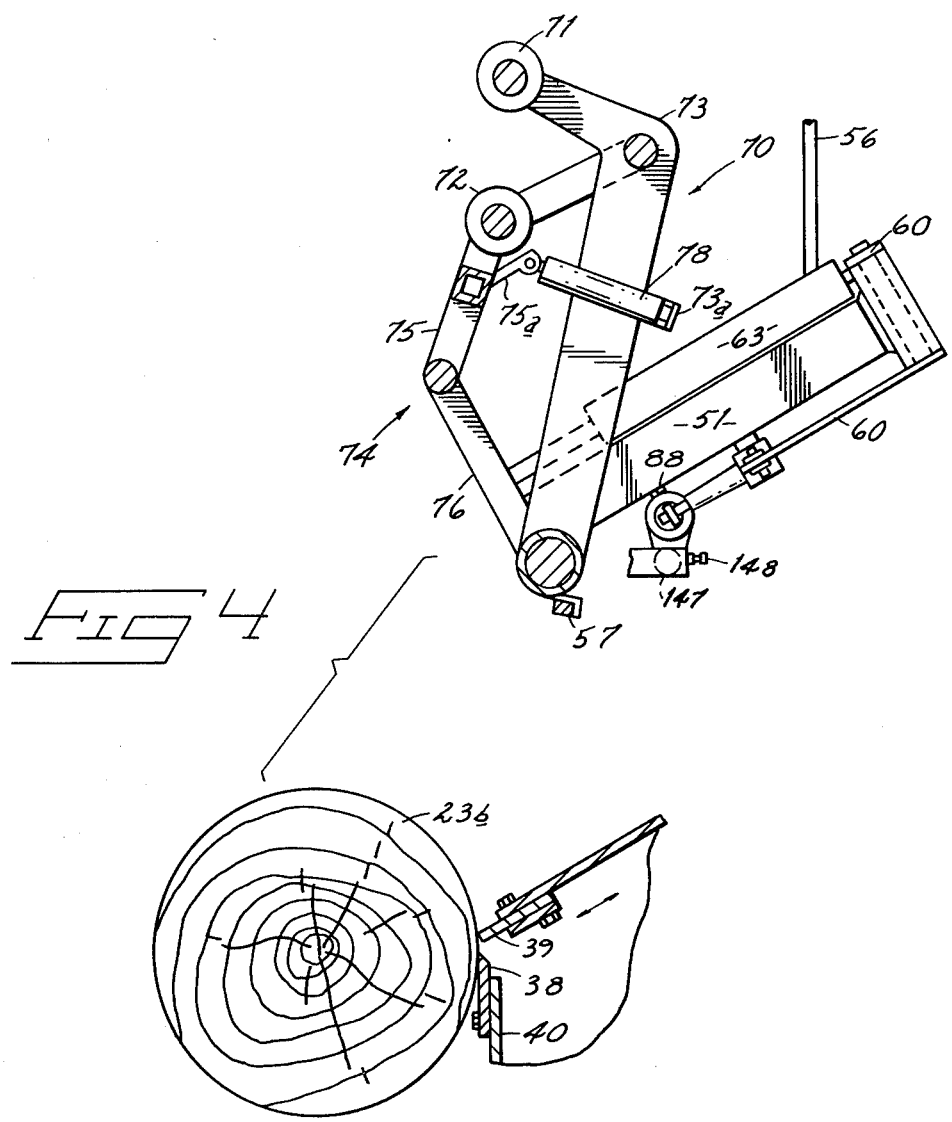

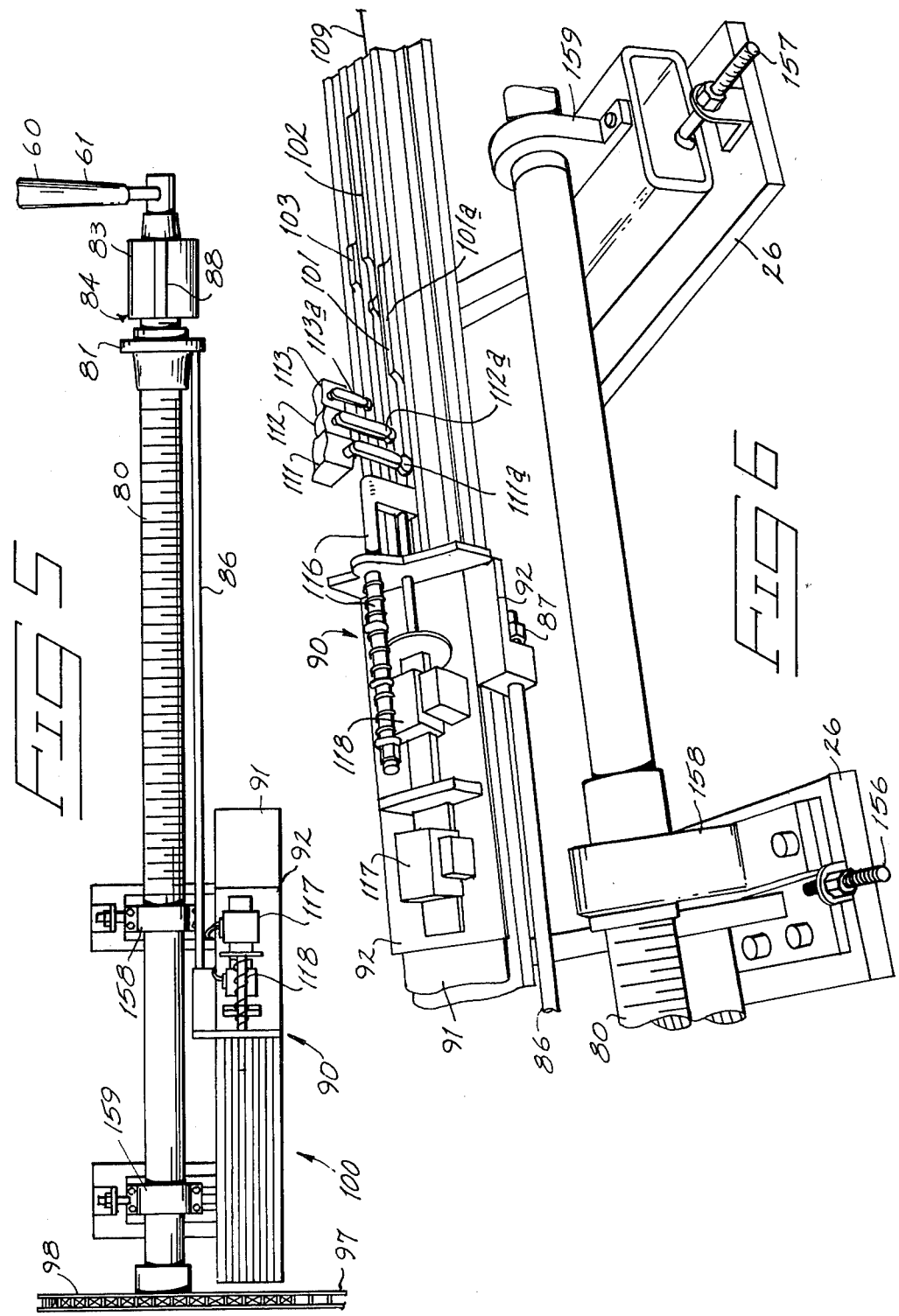

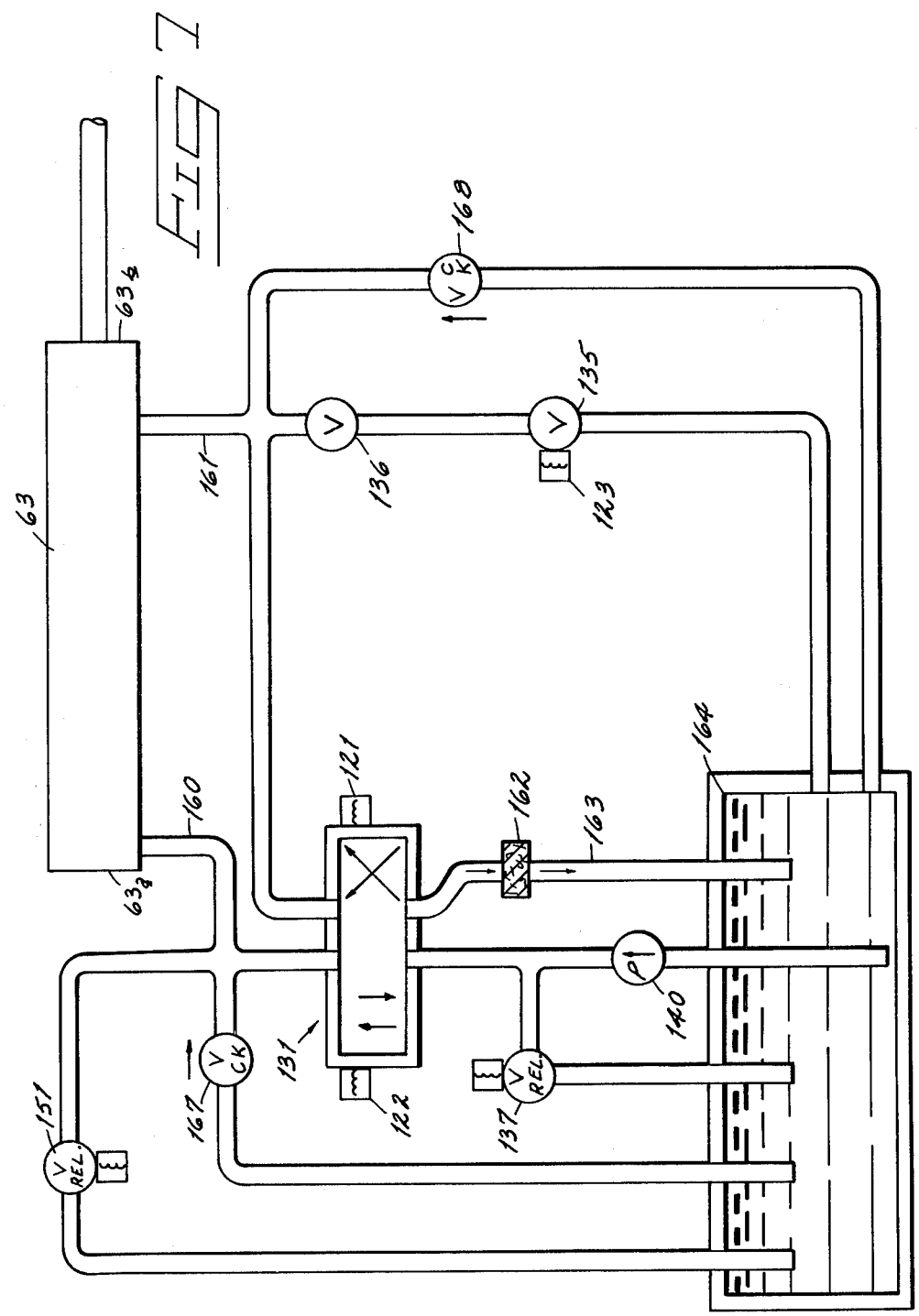

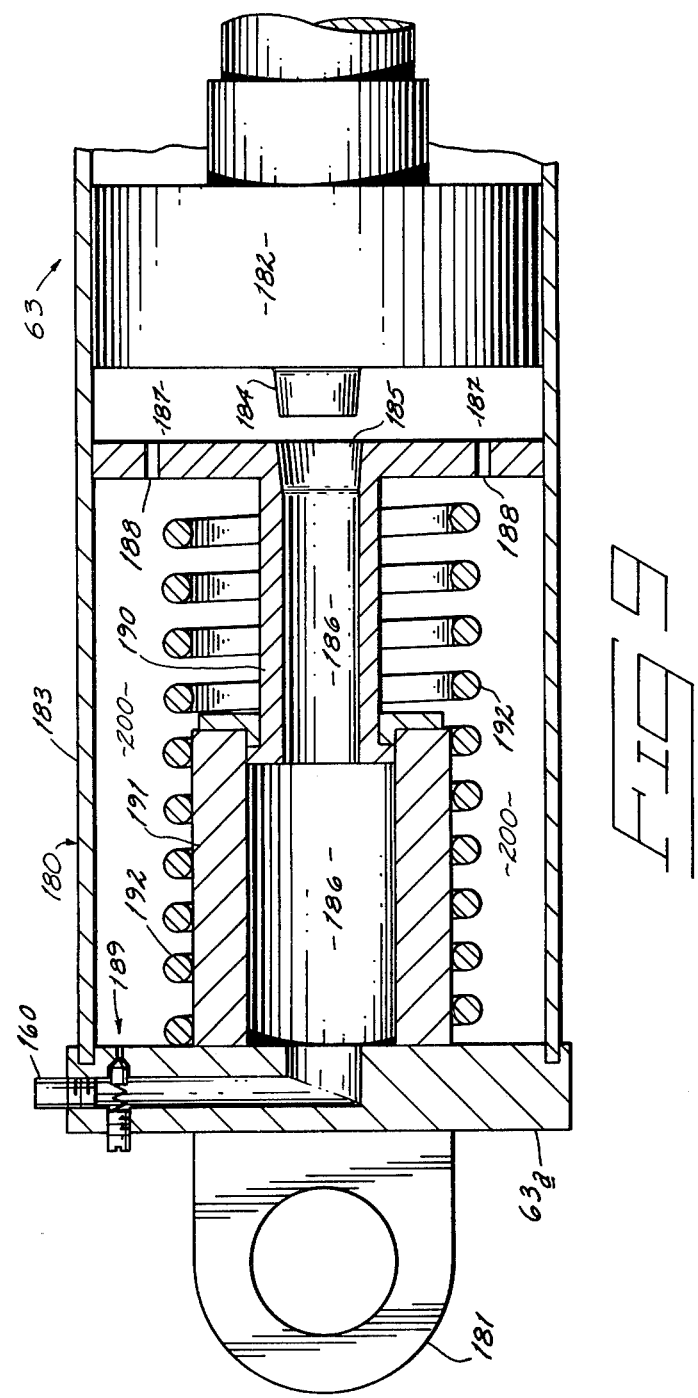

VENEER LATHE HOLD-DOWN ROLLS

TECHNICAL FIELD

The technical field of this invention is back-up or hold-down rolls used with veneer lathes in the removal of veneers from wooden logs.

BACKGROUND OF THE INVENTION

Veneer lathes are commonly used in the lumber industry to remove thin layers or veneers from wooden logs. Such veneer lathes commonly use a pair of lathe chucks which support and rotate the log from which the veneer is being cut. Adjacent to the lathe chucks is the knife used to cut the veneers. The knife is usually supported on a knife carriage which also supports a nose bar which presses against the log immediately before the knife edge severs the veneer from the log. A great deal of force is necessary to turn the log against the knife and nose bar. This force must be carried by the log along its entire length which causes the log to deflect just like any beam under loaded conditions. Cutting the veneer from a deflected log produces a veneer which is not planar and also causes the log to become barrel shaped.

The prior art includes several inventions which were directed to maintaining the log in a coaxial position with the rotating lathe chucks by supporting the log with rollers at a point or points away from the knife edge. None of the prior art back-up rolls have proven to be entirely satisfactory. Some of the deficiencies or shortcomings of the prior art are discussed below.

Many of the prior art back-up rolls were very large and bulky machines which restricted access to the lathe chucks for loading logs. The bulkiness of the prior art back-up rolls was compounded by the fact that the back-up rolls were usually positioned over the lathe chucks, thereby preventing an overhead crane from being used to place logs in the lathe. Since an overhead crane could not be used, it was necessary to load the logs using forklifts or a charger arrangement. These loading techniques were more difficult than using overhead cranes and accordingly required greater amounts of time. Large bulky back-up rolls machines also restricted the operator's access to the log in order to clear slivers from the knife edge. Such slivers cause scarring of the veneer and are a routine problem during the operation of a veneer lathe.

Some prior art back-up roll machines were mounted upon the knife carriage. When a log would break or fly apart during the veneer cutting process a large force would be applied to the back-up rolls. This force would be carried through the knife carriage. In many instances the force applied to the back-up rolls would exceed the strength of the knife carriage arrangement causing brackets or other mounts to fail. This particular problem instigated the applicant's development of the current invention.

Many of the prior art back-up roll mechanisms used two rolls mounted on a pivotable plate so that the force applied by the rolls would approximately be balanced between the rolls by the automatic rotation of the plate. This arrangement was found to be unsatisfactory because the pivotable plate and rolls tend to oscillate or chatter because of waves or other surface roughness of the log. Occasionally the pivotable plate arrangement would cause the non-circularity of the logs to be aggravated by the fluctuating pressure applied by the back-up rolls as the out-of-round log would turn in the lathe.

Many of the prior art back-up rolls were hydraulically controlled. In most of these hydraulically controlled arrangements a given quantity of hydraulic fluid would be supplied to an operating cylinder. If there was any leakage in the hydraulic system the length of the hydraulic ram would become shorter and the support offered by the back-up rolls would be altered. This would change the veneer flatness and cause the log to become non-cylindrical. Hydraulically controlled back-up rolls also suffered from generally unsatisfactory operator control over the load being applied by the back-up rolls.

At least some prior art machines used followers which rode against the outside diameter of the log at a position near the lathe chucks. The desired back-up roll pressure or position of the back-up rolls was controlled from the information about the log size supplied by the follower. These arrangements were not entirely satisfactory because of irregularities in the surface contour of the log and because of the mechanisms used for translating the follower information into positioning of the back-up rolls.

Many prior art back-up roll systems did not provide appropriate or sufficient safety features so that operators could easily work in or around the lathe to clear chunks and slivers of wood. Even where provision was made for access, operational controls were not designed to facilitate the operator's quick and easy removal of chunks and return to the operating station.

Prior art back-up rolls generally did not provide an automatic feed system which allowed the operator to set the back-up rolls in an automatic position and to operate the lathe through a full cycle without touching the back-up roll controls. Nor did the prior art provide a system with total release of the back-up roll mechanism when a log flies apart in the lathe chucks.

Many prior art back-up roll systems did not provide for adequate adjustments for the roll positioning system to compensate for deflection of the lathe and back-up roll machinery. the structural frame of the lathe and back-up roll assembly were also often not sufficiently strong, causing substantial deflection in the machinery. Both of these problems caused the veneer to be non-planar. Vibration of the back-up roll system was also a problem in many prior art machines.

The applicant's invention seeks to solve the above problems of the prior art. The invention also contains other advantages and objectives which are set forth herein or which are implicit in the structure and function of the invention.

BRIEF DESCRIPTION OF THE DRAWINGS

Preferred and alternate forms of the present invention are illustrated in the accompanying drawings in which:

FIG. 1 is a isometric view of a veneer lathe incorporating the hold-down rolls of this invention, portions have been removed for clarity of presentation;

FIG. 2 is a sectional view taken along section line 2—2 of FIG. 1, for illustrative purposes FIG. 2 shows a larger log than shown in FIG. 1;

FIG. 3 is a sectional view taken along section line 3—3 of FIG. 1;

FIG. 4 is a sectional view of the roll carriage showing the roll carriage in the retracted position;

FIG. 5 is a top view of the mechanical feed screw mechanism used to pivot and feed the roll carriage into the log. FIG. 5 also shows the linear cams used to automatically control the invention;

FIG. 6 is a perspective detail view of the linear cams shown in FIG. 5 from the rear of the machine;

FIG. 7 is a schematic drawing of the hydraulic system;

FIG. 9 is a side cross-sectional view of the hydraulic cylinder shock absorber.

DETAILED DESCRIPTION OF THE PREFERRED EMBODIMENTS

Figure 8:
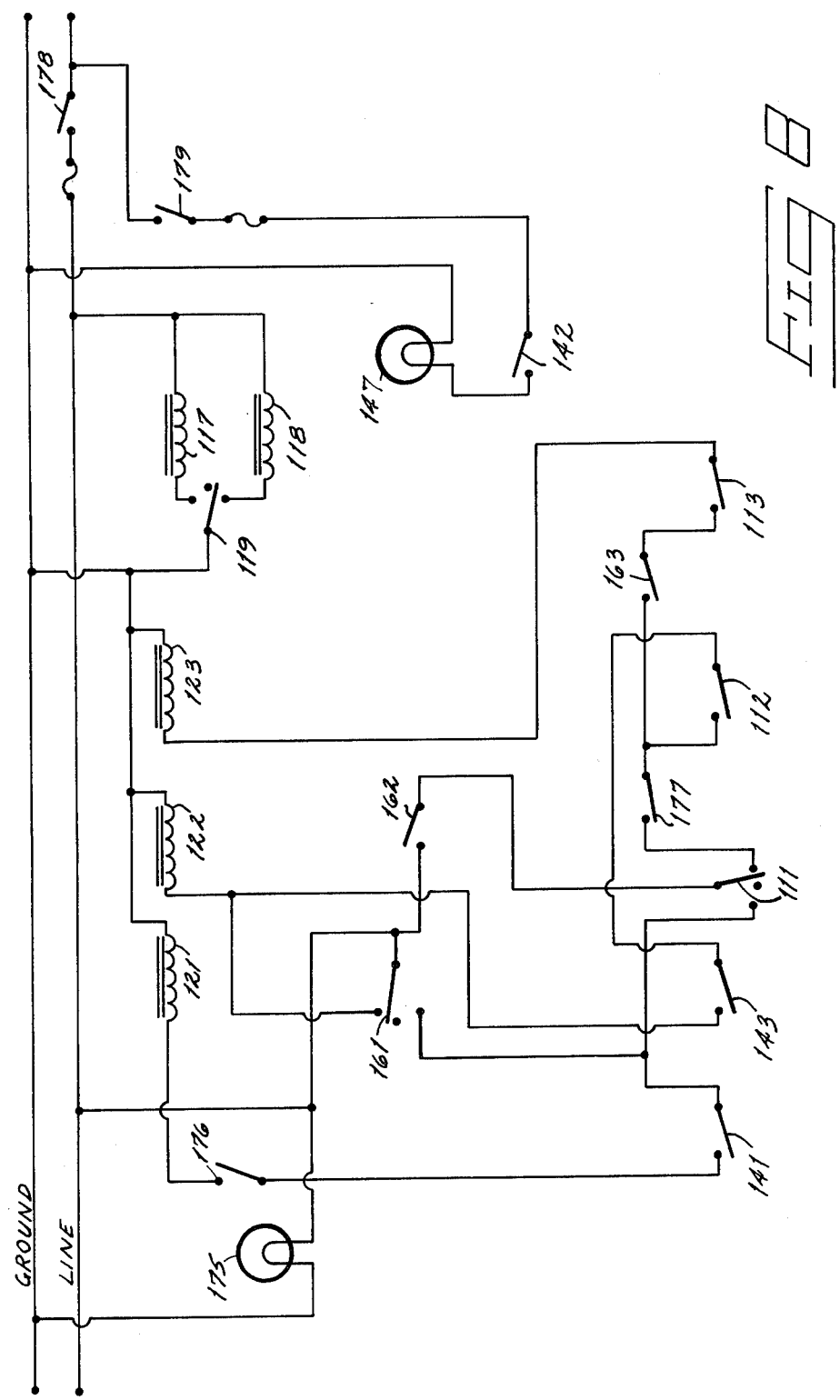
FIG. 8 is a schematic drawing of the electrical system.

In compliance with the constitutional purpose of the Patent Laws "to promote the progress of science and useful arts" (Article 1, Section 8), applicant submits the following disclosure of the invention.

FIG. 1 shows a veneer lathe incorporating the hold-down roll system of this invention. The veneer lathe generally referred to by the reference numeral 20 has chucks 21 and 22 for engaging the end of a log 23. The chucks are movable inward and outward, using chuck screws 24 (shown only at one end) which are driven by an electrical motor (not shown). Newer lathes have multiple diameter hydraulically applied automatically retracting chucks. Lathe chucks 21 and 22 are rotatably supported within the lathe frame 26. Chucks 21 and 22 are driven at the same speed by using a common drive shaft 28 to drive gears 31 and 32 which are directly coupled to lathe chucks 21 and 22, respectively.

A movable knife carriage 40 is slidably mounted on lathe frame 26 and is driven toward and from the lathe chucks using feed screws 42 and 43. Knife carriage feed screws 42 and 43 are mechanically driven by a common power source and drive mechanisms (not shown) so that they turn at the same speed through the same distance.

Lathe frame 26 also includes a transverse bar 45 for supporting the hold-down roll machine 50 of this invention. Transverse bar 45 is securely mounted to the remainder of the lathe frame 26 using heavy mounts 46 and 47. This very strong mounting arrangement for the transverse bar 45 gives it substantial rigidity to resist the large loads applied to the hold-down roll machine during the veneer cutting operation. Torque applied to the hold-down roll machine is also resisted by an anti-rotation bar 56 which is secured to a large structure such as the surrounding building or overhead steel bridge structure (not shown).

The hold-down roll machine 50 includes a frame 51 which is securely mounted on transverse bar 45 using large keys 52 (see FIGS. 1 and 2). Frame 51 defines a slot or way 53 which guides and supports a toothed rack 54 for linear motion therein. Frame 51 also has a bell crank 60 pivotally supported by mount 58 at the end opposite from the toothed rack. A hydraulic ram 63 extends across the top of frame 51 and is pivotally connected to and supported between the bell crank 60 and the toothed rack 54.

When hydraulic ram 63 is extended, it causes toothed rack 54 to slide relative to frame 51. A gear 55 engages the tooth rack 54 and is rotated about transverse bar 45. Since gear 55 is directly connected to the roll carriage 70, it causes it to rotate about transverse bar 45. Roll carriage 70 can pivot about transverse bar 45 through a range of angular positions as shown in FIGS. 2, 3 and 4. FIG. 2 shows roll carriage 70 in a position where medium sized log 23a is being supported. FIG. 3 shows a small log 23 being supported. FIG. 4 shows the roll carriage in a retracted position which allows large log 23b to be loaded with an overhead crane (not shown).

Roll carriage 70 has two rotatable rolls 71 and 72 mounted thereon. Outer roll 71 is rotatably mounted at the extreme end of main arm 73. Inner roll 72 is rotatably mounted on a link mechanism 74 which causes it to move relative to outer roll 71 as will be explained below.

The link mechanism 74 includes second arm 75, third arm 76, and fourth arm 77. Second arm 75 is pivotally connected to main arm 73. Third arm 76 is pivotally connected to second arm 75. Fourth arm 77 is pivotally connected to third arm 76. Fourth arm 77 pivots about transverse bar 45 using an attached sleeve 77a which is pivotable about sleeve 73c which extends thereunder and is rigidly connected to gear 55.

The link mechanism 74 is moved relative to main arm 73 when the roll carriage 70 pivots downwardly so that the fourth arm 77 strikes a stop bar 57 which is adjustably connected to the hold-down frame 51 (see FIG. 3). As main arm 73 continues to pivot downwardly fourth arm 77 is pivoted with respect to the main arm 73 as the arrows in FIG. 3 indicate. This causes third arm 76 to be translated outwardly and to also pivot. The movement of third arm 76 pivots second arm 75 to change the position of inner roll 72 with respect to outer roll 71. The length and arrangement of main arm 73, second arm 75, third arm 76, and fourth arm 77 are such that the outer and inner rolls 71 and 72 maintain a position which is always tangent to the surface of the log through a range from approximately 16" to 6" diameter logs. The tangent positions of outer and inner rolls 71 and 72 supports the log 23 keeping it aligned coaxially between the lathe chucks 21 and 22. This coaxial position is necessary so that the veneer 25 is cut uniformly and in a planar shape so that the veneer will lay flat.

Stop bar 57 is adjustable by turning screws 258a of adjustment brackets 258 or with an equivalent means for moving the stop bar 57 so that fourth arm 77 engages the stop bar at an appropriate angular position of roll carriage 70.

The link mechanism 74 is further provided with a pair of spring-loaded shock absorbers 78 and 79 which have been omitted from FIG. 1 for clarity of presentation. The shock absorbers are mounted on brackets 75a, b and 73a, b which are part of third arm 75 and main arm 73, respectively. Spring-loaded shock absorbers 78, 79 provide a spring force between main arm 73 and third arm 75 to help reduce any looseness in the link mechanism 74 also providing a preload against which the stop bar 57 and log 23 must act. This in combination with the shock absorbers reduces vibration and provides for very smooth operation of the hold-down roll mechanism thereby improving the quality of veneer produced. an alternative embodiment of the invention includes hydraulic cylinders instead of spring-loaded shock absorbers 78, 79. Such hydraulic cylinders (not shown) would be supplied with a hydraulic fluid from an adjustable pressure control valve (not shown).

Hydraulic ram 63 is extended or contracted to move the roll carriage 70 from a retracted position, as shown in FIG. 4, to an idle position which maintains the rolls just against the surface of log 23. Hydraulic ram 63 is not used to carefully control the position of roll carriage 70 when the rolls are supporting log 23. Instead hydraulic ram 63 is maintained in a fully extended position during this operation and all movement of the roll carriage 70 is caused by pivoting bell crank 60 which moves the fully extended hydraulic ram 63 forward. As a safety feature hydraulic ram 63 also allows roll carriage 70 to rotate upwardly very quickly when an excessive load is applied such as when a log flies apart. The hydraulic ram 63 contracts very quickly in response to this heavy load because of a large capacity pressure relief valve 151 which is installed in the hydraulic system which will be more completely discussed below.

Bell crank 60 rotates to move hydraulic ram 63, thereby controlling the motion of roll carriage 70. FIG. 5 shows the feed screw mechanism used to pivot bell crank 60. Bell crank 60 is mounted in pivotal support 258 (see FIG. 1). Third feed screw 80 is powered by the same prime mover as the knife carriage feed screws 42 and 43 through a chain 97 and sprocket 98 attached to the end of feed screw 80. Having a third feed screw mechanically interconnected with the knife carriage feed screws 42, 43 positively positions the hold-down rolls 71, 72 with respect to the position of knife carriage 40 and knife 38.

A threaded follower 81 is threadably received on the third feed screw 80. To prevent threaded follower 81 from rotating with the feed screw there is an anti-rotation bar 82 which passes through the threaded follower. The threaded follower 81 is slidable with respect to anti-rotation bar 82. This arrangement allows the threaded follower to proceed up and down the third feed screw in response to rotation of the third feed screw 80. Threaded follower 81 is appropriately positioned upon third feed screw 80 so that it strikes the follower block 83 when the roll carriage is to be forced against log 23.

The third feed screw 80 is rotatably mounted within follower block 83 by journal bearing 84. Journal bearing 84 allows the follower block 83 to slide axially when contacted by threaded follower 81 after it has progressed down the feed screw 80. Further rotation of feed screw 80 causes the threaded follower 81 to continue traveling down the third feed screw forcing the follower block 83 in the same direction. Journal bearing 84 is sufficiently long so that full travel of the follower block 83 can occur while still maintaining support for third feed screw 80. Follower block 83 is slidably mounted upon the anti-rotation bar 82 and can be further prevented from rotating by an additional anti-rotation slide bar 88 which engages frame 51.

Follower block 83 is slidably connected to the end of bell crank 60 by passing the lower end 61 of the bell crank through an aperture 83a. The third feed screw 80 is mounted in bearings 158 and 159 which are movable upon frame 26 using adjustment bolts 156 and 157. This adjustable arrangement allows the third feed screw 80 and follow block 83 to be moved back and forth so as to adjust the lever arm length at which the follower block 83 acts upon bell crank 60. The anti-rotation bar 82 is supported at its end by a bearing 147 which is adjustable with respect to frame 26 by turning adjustment bolt 148. This adjustment of the anti-rotation bar complements the adjustments of the third feed screw position just described.

Bell crank 60 is pivoted counterclockwise as shown in FIG. 1 when follower block 83 is pressed by threaded follower 81. This causes the upper end 62 of bell crank 60 to also turn counterclockwise. The end of hydraulic ram 63 is pivotally connected to the upper end 62 of the bell crank at pivot 68. As the bell crank 60 is rotated by the system just described, it causes the fully extended hydraulic ram 63 to shift forward as if it were a rigid mechanical link, thereby causing the hold-down rolls 71, 72 to progress through their appropriate range of motions to maintain the log coaxially within lathe chucks 21 and 22.

The pneumatic cylinder 59 is connected between the lower arm 61 of bell crank 60 and frame 51. This pneumatic cylinder operated by its pressure regulator control preloads the actuating system to take out any looseness or lash, thereby leading to more precise location of rolls 71 and 72.

The control system for the hold-down machine 50 will now be considered. The heart of this control system is an arrangement of linear cams 101, 102, 103 which close or open limit switches 111, 112, 113. The limit switches control solenoids 121, 122, 123 (see FIGS. 7, 8) which activate hydraulic valves 131 and 135 causing hydraulic fluid to flow to and from hydraulic ram 63. Having outlined the basic operation of the control system, the parts and operation will be fully described below.

The linear cam and limit switch arrangement is coordinated with the position of knife carriage 40 using third feed screw 80 and threaded follower 81. Threaded follower 81 has a linear cam actuating rod 86 attached at one side which runs between the threaded follower 81 and the linear cam assembly 90. The end of rod 86 is slidably received in the linear cam assembly baseplate 92. The end of rod 86 is threaded to receive nut 87 which is adjustable thereon. When threaded follower 81 has moved rod 86 sufficiently far, the nut 87 engages the baseplate 92 and slides the linear cam assembly 90 along way 91 which is securely attached or forms a part of frame 26. This arrangement moves linear cam assembly 90 only after threaded follower 81 has proceeded down third feed screw 80 and is ready to engage the follower block 83.

The linear cam assembly 90 includes first, second and third linear cams 101, 102 and 103, respectively. Linear cams 101, 102 and 103 have raised and lowered portions which move the pivoting arms or cam followers 111a, 112a, 113a of first, second, and third limit switches 111, 112, 113, respectively.

The linear cam control system operates in the following manner. As threaded follower 81 approaches the follower block 83, the nut 87 engages the cam assembly baseplate 92 and causes the cams 111, 112, 113 to begin moving on way 91 in relation to limit switches 111, 112, and 113. First, second, and third limit switches 111, 112, and 113 are initially open or off and their cam followers 111a, 112a, 113a extend downwardly because cam 101, 102, 103 have low profiles.

As the cam assembly slides along first cam 101 has a raised profile which causes first limit switch 111 to close. This places the control system in a down mode for extending the roll carriage toward the log. When cam 101 returns, switch 111 closes to a second pole, thereby placing the control system in a return mode for lifting the roll carriage away from the log.

Next second switch 112 is closed allowing current to flow to solenoid 122. Solenoid 122 causes closed center control valve 131 to direct hydraulic fluid from pump 140 through line 160 to extend hydraulic ram 63. Fluid from the rod end 63b of ram 63 returns through line 161, valve 131, filter 162 and line 163 to reservoir 164.

The ram 63 is forcibly extended only a short distance so that the center of gravity of roll carriage 70 will pass just over transverse bar 45. This enables the roll carriage to drift downwardly under the force of gravity to extend hydraulic ram 63 until roll carriage 70 is in the idle position and rolls 71, 72 are against log 23. The gravity forced movement of hydraulic ram 63 and roll carriage 70 is possible because check valve 167 allows fluid to flow from reservoir 164 to the piston end 63a of ram 63. Hydraulic fluid flows from the rod end 63b of ram 63 through blocking valve 135 which is opened by solenoid 123. Solenoid 123 is energized when limit switch 113 is closed by the action of cam follower 113a on cam 103. The rate at which the carriage 70 drops is controlled by manually operated valve 136.

In the idle position inner roll 72 rides against log 23 with only the weight of the carriage forcing it downward. When the knife 38 has cut the log to approximately 14 inches in diameter, the cams 103 and 102 deflect switches 113 and 112, thereby energizing solenoids 123 and 122 so that blocking valve 135 is closed and control valve 131 is opened. Pressurized hydraulic fluid is applied to piston end 63a of ram 63, thereby forcing ram 63 into a fully extended position. Pressurization of ram 63 occurs at approximately the same time as the threaded follower 81 engages follower block 83 pivoting bell crank 60. Bell crank 60 moves fully extended hydraulic ram 63 outwardly causing toothed rack 54 to turn gear 55 which in turn rotates main arm 73 downwardly. The hydraulic ram is maintained in a fully extended position by the pressure of hydraulic pump 140 which is supplied through valve 131 to the piston end 63a of ram 63. This continuous supply of hydraulic fluid extending ram 63 eliminates problems associates with leakage from hydraulic rams. Leakage from prior art fixed volume hydraulic-controlled back-up roll machines caused the rolls to be incorrectly positioned so that the logs were not adequately supported.

The hold-down rolls 71, 72 are automatically positioned at locations which keep the log coaxial as the log is being reduced in size by the veneer lathe. When the operator cuts the log to a minimum log diameter he manually returns the knife carriage 40. At this point the first limit switch 111 has already reached the end of the raised portion 101a of first cam 101 and the return motion of the cam assembly 90 causes cam follower 111a to deflect in the other direction during the return stroke so that switch 111 automatically changes the control system to the return mode. Electrical current then flows through switch 111 to energize solenoid 121. Solenoid 121 opens valve 131 so that hydraulic fluid flows from pump 140 into line 161 to the rod end of ram 63. This forces ram 63 to contract, thereby lifting the roll carriage 70 to the retracted position where it is automatically brought to rest by switch 141 and gently brought to rest by the hydraulic shock absorber 180.

Cam assembly 90 is returned by a suspended weight (not shown) attached to line 109 which pulls the assembly back to the starting position which is to the right in FIG. 6.

Linear cam 101 is provided with solenoids 117 and 118 which slide the cam with respect to the other cams 102, 103 and cam assembly baseplate 92. The solenoids 117, 118 can be positioned to shift cam 101 so that the mode change occurs automatically at either 6, 7, or 8 inch diameter log sizes. Other mode change points are possible with appropriate changes to the position or shape of cam 101. Solenoids 117 and 118 are mechanically coupled in series to produce the desired movement of cam 101 along baseplate 92. A selector switch 119 control energization of solenoids 117, 118. A spring return mechanism 116 is provided to return the first linear cam 101 when the solenoids 117, 118 are not energized.

The control system includes several other components which will now be described. Referring to FIG. 2 there are three switches 141, 142, 143 connected to frame 51 and activated by a linear cam 144 attached to the toothed rack 54 so that the roll carriage is not forced beyond its intended range. Switch 141 opens the circuit when ram 63 is nearly fully contracted, thereby removing hydraulic pressure from the rod end 63b of ram 63. Switch 143 opens the circuit when ram 63 is nearly fully extended, thereby removing hydraulic pressure from the piston end 63a of ram 63 to prevent overextension of roll carriage 70. Safety switch 142 closes the circuit to light lamp 147 which visually indicates that roll carriage 70 is advancing downward.

Switches 161, 162, and 163 are preferably contained within a single electrical control unit having a single operational stick. An example of such an electrical control unit is No. 10250T4513 manufactured by the Cutler Hammer Co. This electrical control unit allows the operator to manually raise or lower the roll carriage or set the roll carriage to operate automatically as described above. Automatic operation of the control system can be interrupted so that chunks or slivers can be removed from the knife edge 38 or nose bar 39. Cutting can be resumed without resetting the automatic control system.

Light 175 is activated when the control system is energized. Switch 176 is a safety switch which is manually controlled by the operator when work must be performed on or around the machine. Switch 177 is a limit switch which allows the hold-down rolls to operate only when the knife carriage 41 feed clutch (not shown) is engaged. Switch 178 is the main fuse disconnect for supplying electrical power to the entire machine circuit. Switch 179 activates the safety light 147 circuit which is independent in case the circuit supplied through switch 178 should fail.

The hydraulic system is provided with a large capacity relief valve 151 which allows the ram 63 to contract very quickly when a log flies apart. Relief valve 137 is provided to protect pump 140 when the pump does not automatically unload or the discharge has no other available path.

The hydraulic ram 63 is provided with a shock absorber mechanism 180 shown in FIG. 9. Endpiece 181 allows ram 63 to be pivotally connected to bell crank 60. The ram piston 182 slides within outer cylinder 183 in response to inflow and outflow of hydraulic fluid. When piston 182 approaches the piston end 63a of ram 63 a small plug 184 fits within seat 185 to seal off the main passageway 186 available for flow of hydraulic fluid. Further flow of hydraulic fluid from space 187 must pass through apertures 188 and then through a small relief valve 189. After the hydraulic fluid has passed through relief valve 189 it is free to pass through line 160 to the reservoir through either valves 151 or 131.

The shock absorber is also provided with a second piston 190 which is slidable within an inner cylinder 191. Second piston 190 forms a seal against the inside of inner cylinder 191. Ram piston 182 forces second piston to slide toward piston end 63a causing hydraulic fluid in space 200 to flow out through relief valve 189. A spring 192 biases piston 190 to an extended position. The shock absorber greatly reduces impact loads which occur when the ram 63 is quickly contracted due to the rapid return of roll carriage 70 to the retracted position.

I claim:

1. A hold-down roll apparatus used with a veneer lathe to cut thin sheets of veneer from a wooden log, the veneer lathe having a frame, a pair of chucks for supporting and turning the log, and a knife supported by a knife carriage travelable toward and from the rotational axis of the chucks, comprising:

inner and outer rolls for tangentially contacting and supporting the log in a position substantially coaxial with the lathe chucks; and a roll carriage for pivotally supporting the rolls upon the lathe frame; said roll carriage comprising:

(a) a main arm pivotally supported upon the lathe frame, said main arm having the outer roll rotatably mounted thereon;

(b) a second arm pivotally connected at one end to the main arm;

(c) a third arm pivotally connected at one end to the second arm;

(d) a fourth arm pivotally connected at one end to the third arm and at the other end to the lathe frame;

(e) said inner roll being rotatably supported near the pivotal connection between said second and third arms; and (f) a stop bar mounted to the lathe frame for engaging said fourth arm as the roll carriage pivots toward the log to cause the inner roll and outer roll to move relative to each other to maintain the rolls in positions tangential to the log throughout a range of log diameters and to move the rolls closer together for better support of the log.

2. The hold-down roll apparatus of claim 1 further comprising means for pivoting the roll carriage about the lathe frame such that the roll carriage engages the log.

3. The hold-down roll apparatus of claim 1 further comprising means for rotating the roll carriage about the lathe frame; said means for rotating the roll carriage being mechanically interconnected with the operation of the veneer lathe such that the rolls move toward the longitudinal axis of the log at the same rate as veneer is removed from the log thereby maintaining the rolls in tangential positions throughout a range of log diameters.

4. The hold-down roll apparatus of claim 3 wherein the means for rotating the roll carriage is mechanically linked with the travel of the knife carriage thereby providing the coordination necessary to maintain the rolls tangent to the log.

5. The apparatus of claim 1 further comprising means for rotating the roll carriage about the lathe frame, said means for rotating the roll carriage comprising:

a feed screw driven by a power source mechanically interconnected with the knife carriage;

a threaded follower mounted upon the feed screw and adapted to travel linearly thereon;

a follower block engageable by the threaded follower to move the follower block;

a bell crank connected to the follower block and pivotally mounted for angular motion;

a hydraulic ram mounted at one end upon the bell crank and movable thereby in a direction substantially the same as the direction in which the hydraulic ram extends and contracts;

a toothed rack slidably mounted on the lathe frame connected to and supporting the end of the hydraulic ram opposite from the bell crank; and a gear engaging the toothed rack and rigidly connected to the roll carriage to pivot the roll carriage about the lathe frame.

6. The hold-down apparatus of claim 5 further comprising automatic control means having:

a linear cam assembly slidably mounted on the lathe frame and connected to the threaded follower for movement therewith;

electrical switching means controlled by the linear cam assembly to control flow of electrical current;

solenoid actuated hydraulic valve means controlled by the electrical switching means for directing pressured hydraulic fluid to and from the hydraulic ram;

manually operated switching means for operating the apparatus.

* * * * *